Dec. 14, 1948.  F. W. SCHWINN  2,456,536
PARKING STAND AND MOUNTING THEREFOR
Filed Dec. 29, 1945  2 Sheets-Sheet 1
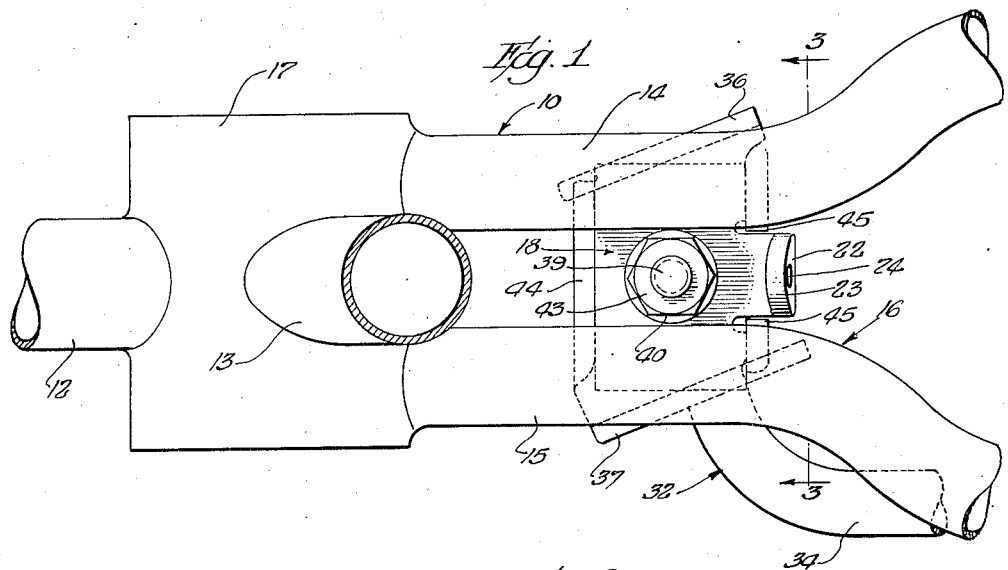
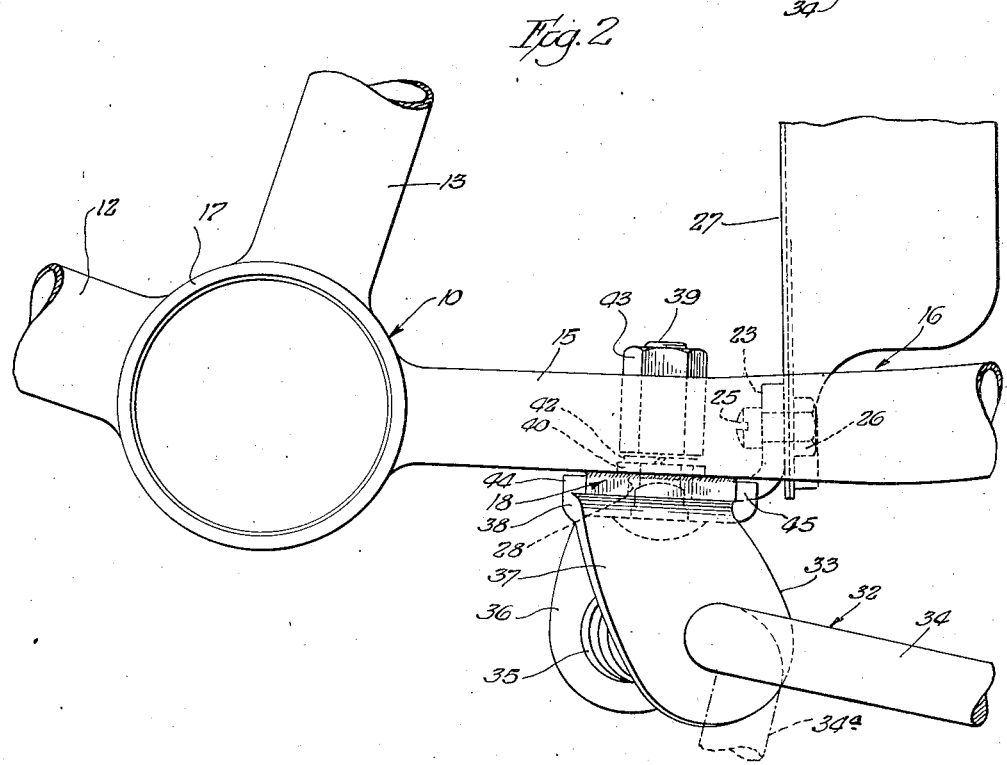
Inventor:
Frank W. Schwinn
By: Albert G. McCaleb
Atty.

Dec. 14, 1948.    F. W. SCHWINN    2,456,536
PARKING STAND AND MOUNTING THEREFOR
Filed Dec. 29, 1945    2 Sheets-Sheet 2
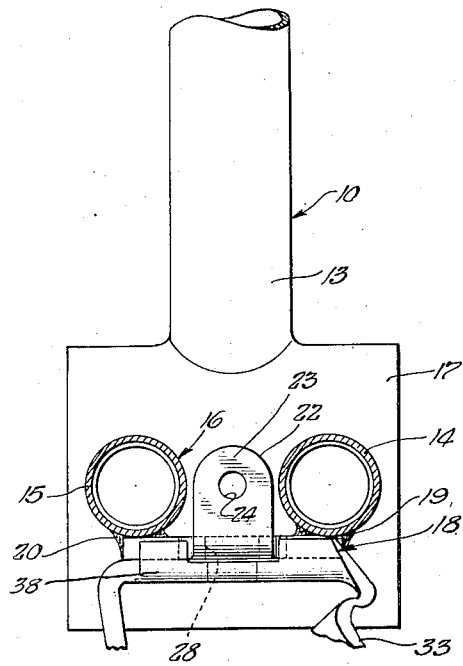
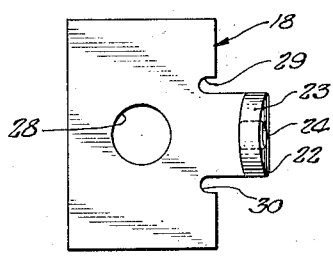
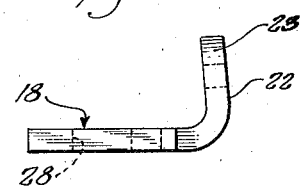
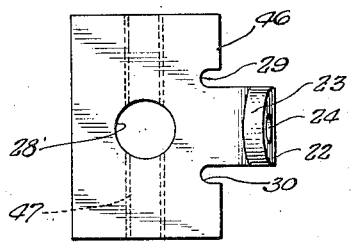
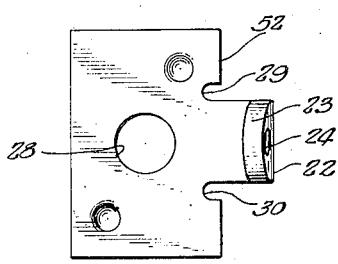
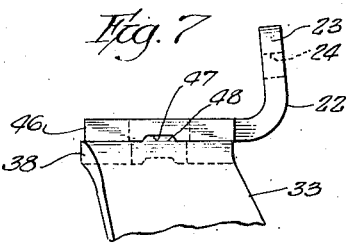
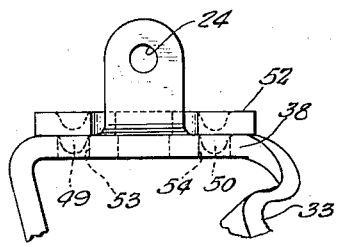
Inventor
Frank W. Schwinn
By Albert G. McCaleb
Atty.

Patented Dec. 14, 1948

2,456,536

UNITED STATES PATENT OFFICE 2,456,536

PARKING STAND AND MOUNTING THEREFOR

Frank W. Schwinn, Chicago, Ill.

Application December 29, 1945, Serial No. 637,841

1 Claim. (Cl. 280—301)

This invention relates to parking stands of the type used on bicycles, motorcycles and the like, and improved means for mounting such stands on the cycle frames.

It is a general object of my present invention to provide a rugged and durable parking stand support structure including coacting parts on the stand and the frame of a bicycle, motorcycle or the like.

Another object of the invention is to provide a parking stand for bicycles, motorcycles and the like, which may be securely fastened in position without the use of conventional type of clamp which has a tendency to crush or deform the tubular frame structure of the cycle.

As a further object, my invention comprehends the provision of a parking stand support structure which definitely locates the stand linearly and angularly relative to the other parts of the cycle structure with which it is used.

My invention also contemplates the provision of a parking stand mounting which will not work loose in use and permit the stand to rattle.

Other objects and advantages of the invention will be apparent from the following description and the accompanying drawings in which similar characters of reference indicate similar parts throughout the several views.

In the drawings of which there are two sheets:

Fig. 1 is a fragmentary top plan view of a portion of the frame of a bicycle, motorcycle or the like near the front end of the rear fork and depicting a preferred form of my parking stand and the mounting therefor;

Fig. 2 is a fragmentary side elevational view of the structure shown in Fig. 1 with the addition of an end portion of the rear mudguard to indicate the end anchoring attachment thereof;

Fig. 3 is a fragmentary sectional view with the section taken substantially on a line 3—3 of Fig. 1 and viewed in the direction indicated by the arrows;

Fig. 4 and 5 are respectively top plan and side elevational views of a part utilized in the preferred embodiment of my invention which is depicted in Figs. 1, 2 and 3;

Fig. 6 is a top plan view of a modified form of part similar to that depicted in Figs. 4 and 5;

Fig. 7 is a side elevational view of the part shown in Fig. 6 with the position and structure of a coacting adjacent part illustrated fragmentarily;

Fig. 8 is a view similar to Fig. 6 of another modified form of a similar part; and Fig. 9 is a rear elevational view of the part shown in Fig. 8 with the position and structure of a coacting adjacent part depicted fragmentarily.

The parking stand herein illustrated is of the general type utilized on bicycles, motorcycles and and like and sometimes commonly known as "kick" stands. The usual and previously known forms of such "kick" stands came equipped with a clamping element associated with the stand-supporting bracket and a through bolt for clamping the bracket and clamping element against opposite sides of the rear fork of the cycle frame. Such stands have had a tendency to become loose in use and to rattle or turn to a position in which the stand interfered with the pedal crank. Upon being tightened, there was a tendency to crush and thereby weaken the side frame tubes of the rear fork.

The various forms of my parking stand and the mounting therefor which are illustrated herein not only eliminate the difficulties encountered with previously known forms of such stands but they also serve as a brace between the side frame tubes of the rear fork and may be utilized as an anchor for the front end of the rear mudguard, thus eliminating the necessity of a cross tube near the front end of the rear fork which is usual in most bicycle frame structures.

Referring to the exemplary embodiment of my invention which is depicted in Figs. 1, 2 and 3, a bicycle frame 10 of usual and well known construction is indicated fragmentarily for the sake of increasing the size of the views and thereby emphasizing the details of structure of the pertinent portions thereof. The portion of the frame shown includes that adjacent the front end of the rear fork wherein upwardly and angularly disposed frame tubes 12 and 13 and laterally spaced side tubes 14 and 15 of a rear fork 16 are connected at circumferentially spaced positions to a pedal crank bearing support tube 17. As is usual in bicycle and motorcycle frames, the side tubes 14 and 15 of the rear fork extend rearwardly from the pedal crank bearing support tube in a substantially horizontal direction and in substantially parallel relationship. At a relatively short distance from the pedal crank bearing support tube, the side tubes of the rear fork are curved outwardly to accommodate and provide space for the free movement of the rear wheel and tire therebetween.

In the exemplary stand mountings of my invention which are depicted herein, I have provided a metal strap 18 of substantial thickness which extends laterally across the lower surfaces of the rear fork frame tubes 14 and 15 and has its opposite end portions firmly secured to those side tubes by welding or brazing, as indicated at 19 and 20 in Fig. 3. The strap thus provides a relatively rigid lateral brace between the side tubes and extends downwardly from the lower surfaces of the side tubes to the extent of its thickness which may be, for example about 1/8 or 1/4 of an inch.

In the disclosed form and as desirably constructed to eliminate the necessity of an additional mudguard anchor, the strap 18 is formed by stamping and has at the mid-portion of its rearward edge an integrally formed lug 22 including an end portion 23 projecting angularly with respect to the main body portion of the strap so as to extend upwardly between the side tubes 14 and 15 of the rear fork. A bore 24 in the upwardly extending end portion 23 of the lug accommodates a fastening element, such as a bolt or screw 25 which, with a cooperating nut 26, serves to anchor the forward end of a mudguard 27, as shown in Fig. 2. At a position substantially mid-way between the sides and ends, the strap 18 is provided with a bore 28 which, in the mounted position of the strap, is desirably about mid-way between the side tubes 14 and 15 of the rear fork. Also, in the preferred embodiment of my invention, the corners of the strap adjacent the lug 22 are cut away for relief, as shown at 29 and 30 in Fig. 4.

Although various shapes of straps might be utilized to accomplish a similar result in accordance with the teachings of my invention, the generally rectangular shape, with substantially parallel end and side surfaces, of the laterally extending portion of the strap is considered to be one of the simplest and most economical forms for manufacturing purposes. Furthermore, although other positions might be selected for mounting the strap relative to the side tubes 14 and 15 of the rear fork, the placement of the strap against the lower surfaces of the side tubes provides strength, a desirable lateral span and ease of access for mounting and the placement of the associated stand.

A parking stand 32 of a generally known type includes a stand-carrying bracket 33, a curved stand bar 34, and a biasing spring 35. One end of the stand bar 34 is rotatably supported by downwardly projecting flanges 36 and 37 on opposite sides of the bracket 33. The stand bar is movable between a retracted position, depicted in solid lines in Fig. 2, and a downwardly extending position, indicated by dot and dash lines at 34a. A mechanism (not shown) and including the spring 35 (Fig. 2) holds the stand bar 34 in each of the two illustrated positions. When extended downwardly, the bar provides a prop against which the cycle may lean to stand alone. In its retracted position, the bar 34 extends rearwardly along and below the rear fork in an out-of-the-way position.

To prevent rattling, the stand-carrying bracket 33 must be tightly secured in place. For dependability and to prevent interference with the pedal crank, the stand-carrying bracket and its mounting must not only have ruggedness but must also maintain its position relative to the rear fork.

In the form of my invention disclosed in Figs. 1 and 2, the stand-carrying bracket 33 has a web portion 38 integrally formed with and intermediate the side flanges 36 and 37, which web portion is of substantially the size of, and adapted to fit against, the exposed lower surface of the strap 18.

A bolt 39, together with a washer 40, a lock washer 42, and a nut 43, is utilized firmly to hold the web portion of the bracket in place against the lower surface of the strap 18. Desirably, the bolt 39 is either inserted through a suitable opening in the web portion 38 of the bracket or secured thereto and extends upwardly through the bore 28 in the strap 18 so that the nut is in a convenient position for tightening above the strap and between the side tubes 14 and 15 of the rear fork. Accessibility of the nut for tightening is further enhanced by the extension of the bolt 39 and the use of an abnormally long nut so that it projects above the upper surfaces of the side tubes.

Further to secure the bracket 33 in position relative to the strap and to prevent relative rotation between the strap and the bracket, end flanges 44 and 45 are integrally formed along opposite end surfaces of the web portion 38 of the bracket and embrace opposite parallel edges of the strap 18. As indicated in Fig. 1, the flange 45 has an intermediate opening between the end portions thereof to accommodate the rearwardly projecting lug 22 on the strap. The flanges 44 and 45 are of a height such that they provide a firm grip against the ends of the strap but do not engage the side tubes 14 and 15 of the rear fork so as to interfere with the placement of the bracket.

In the modification of my invention illustrated in Figs. 6 and 7, the general structures of the strap and bracket are similar to those illustrated and described in connection with Figs. 1 to 5, inclusive, and like reference numerals refer to similar parts. However, in this modification a strap 46 has in the mid-portion of its lower surface a laterally projecting channel, which channel is adapted to receive a similarly shaped tongue 48 on the upper surface of the web portion 38 of the stand-carrying bracket 33. The function of the coacting and laterally extending channel and tongue is similar to that of the end flanges 44 and 45 of the form of my invention depicted in Figs. 1 to 5, inclusive. That is, in each instance the flanges 44 and 45 or the channel and tongue 47 and 48 provide coacting and interengaging surfaces between the strap and bracket which are in planes transverse to the general plane of the engaging surfaces of those parts whereby relative rotation between the parts is prevented.

In Figs. 8 and 9 I have illustrated an additional modification of my invention which is adapted to accomplish results similar to the previously described forms in a somewhat different manner. In these figures, also, like reference numerals to those previously used referred to similar parts. In Figs. 8 and 9 integrally formed protuberances 49 and 50 are provided on a strap 52 at laterally spaced positions by deformation of the strap at those positions. In the stand-carrying bracket 33, bores 53 and 54 are provided at corresponding positions in the web portion 38 to receive the protuberances 49 and 50, respectively, and thereby to retain the strap and bracket in their relatively aligned positions.

It is to be understood in connection with each of the different disclosed forms of my invention that the part upon which the retaining flanges, tongue or protuberances is put is merely a matter of choice which does not in any way depart from the spirit or scope of my invention. That is, flanges might be put on the end surfaces of the strap 18 in Figs. 1 to 5, inclusive, to engage end surfaces of the bracket 33 and accomplish a similar result. Likewise, the tongue 48 might be on the strap 46 and coact with a channel or groove in the bracket 33; or the protuberances 49 and 50 might be on the bracket 33 and coact with bores such as 53 and 54 in the strap 52. It is also apparent that flanges or protuberances of other shapes might be utilized or that they might be placed in different positions.

In each form of my present invention the mounting strap is firmly and securely held in position relative to the rear fork without necessitating a clamp to engage opposed fork surfaces. The stand-carrying bracket is secured in position against the strap and has a relatively large bearing area therewith. In addition to these features which provide ruggedness, the angular position of the bracket is maintained by interengaging surfaces of the bracket and strap which are in planes transverse to the main surface of bearing engagement between the strap and bracket.

While I have illustrated a preferred embodiment of my invention, many modifications may be made without departing from the spirit of the invention, and I do not wish to be limited to the precise details of construction set forth, but desire to avail myself of all changes within the scope of the appended claim.

I claim:

For use on a bicycle, motorcycle or the like including a frame having a rear fork with laterally separated side legs and a mud guard having an end portion extending between the side legs, the combination comprising a stamped metal strap of substantial thickness having a body portion secured to and extending laterally across the lower surfaces of the side legs of said fork at a position forwardly of said legs from the extending end of the mud guard, said strap having integrally formed on the body portion thereof a lug projecting angularly from one edge of said body portion intermediate said legs of the fork to serve as an anchor for said end portion of the mud guard, a parking stand support bracket having a portion of a size and shape to fit against the exposed lower surface of said strap, said portion of the bracket having integral flanges along opposite edges thereof for embracing the laterally disposed opposite side edges of the strap, the rear flange having a portion cut away to receive the base of said lug on the strap, and fastening means for removably securing the bracket to the strap with the cut-away flange embracing the sides of the lug laterally offset from said fastening means and in the plane of the body portion of the strap.

FRANK W. SCHWINN.

REFERENCES CITED

The following references are of record in the file of this patent:

UNITED STATES PATENTS

| Number | Name | Date |
| --- | --- | --- |
| 2,161,823 | Kraeft | June 13, 1939 |
| 2,268,051 | Miller | Dec. 30, 1941 |

FOREIGN PATENTS

| Number | Country | Date |
| --- | --- | --- |
| 568,050 | France | Dec. 15, 1923 |